United States Patent [19]

Haartsen

[11] Patent Number: 5,771,453
[45] Date of Patent: Jun. 23, 1998

[54] MULTIPLE USER BASE STATIONS AND METHODS FOR RADIO PERSONAL COMMUNICATIONS SYSTEMS

[75] Inventor: Jacobus Cornelius Haartsen, Staffanstorp, Sweden

[73] Assignee: Ericsson Inc., Research Triangle Park, N.C.

[21] Appl. No.: 492,336

[22] Filed: Jun. 19, 1995

Related U.S. Application Data

[63] Continuation-in-part of Ser. No. 148,828, Nov. 4, 1993, Pat. No. 5,428,668.

[51] Int. Cl.$^6$ ................................................. H04M 11/00
[52] U.S. Cl. ........................... 455/449; 455/406; 455/561
[58] Field of Search ................................... 379/57, 58, 59, 379/61; 455/33.1, 405, 406, 407, 408, 409, 449, 561, 426, 552

[56] References Cited

U.S. PATENT DOCUMENTS

| | | | |
|---|---|---|---|
| 4,790,000 | 12/1988 | Kinoshita | 455/449 |
| 4,802,200 | 1/1989 | Murata | 379/61 |
| 4,878,238 | 10/1989 | Rash | 379/62 |
| 4,953,198 | 8/1990 | Daly et al. | 379/61 |
| 4,989,230 | 1/1991 | Gillig et al. | 379/59 |
| 5,034,993 | 7/1991 | Sasuta et al. | 455/11 |
| 5,040,177 | 8/1991 | Martin | 379/61 |
| 5,127,042 | 6/1992 | Gillig et al. | 379/59 |
| 5,260,988 | 11/1993 | Schellinger et al. | 379/59 |
| 5,276,905 | 1/1994 | Hurst | 455/33.1 |
| 5,280,630 | 1/1994 | Wang | 455/56.1 |
| 5,355,374 | 10/1994 | Hester et al. | 370/84 |
| 5,367,558 | 11/1994 | Gillig | 379/59 |
| 5,390,245 | 2/1995 | Dent | 379/59 |
| 5,406,615 | 4/1995 | Miller, II | 379/59 |
| 5,428,668 | 6/1995 | Dent | 379/59 |

(List continued on next page.)

FOREIGN PATENT DOCUMENTS

| | | |
|---|---|---|
| 0 629 097 A2 | 12/1994 | European Pat. Off. . |
| 5-48526 | 2/1993 | Japan . |
| WO 93/16534 | 8/1993 | WIPO . |
| WO 94/03993 | 1/1994 | WIPO . |
| WO 95/12957 | 5/1995 | WIPO . |

OTHER PUBLICATIONS

*Microcellular Structures and Their Performance*, H. Persson, IEEE, 1992, pp. 413–418.
*NTT to Market Cordless Telephone for Office Buildings*, Comline Telecommunications, Jun. 29, 1988, p. 4.
*SW Bell Mobile Plans PCS*, A. Lindstrom, Communications Week, No. 448, Apr. 5, 1993, p. 6(1).
*Bell Atlantic and Motorola to Test Personal Communications Service*, Warren Publishing, Inc., Audio Week, vol. 4, No. 7, Feb. 17, 1992.
*RHCS Stake Claim to Personal Communications Licenses*, Capitol Publications, Inc., FCC Week, vol. 7, No. 42, Nov. 5, 1990.

(List continued on next page.)

*Primary Examiner*—Dwayne Bost
*Assistant Examiner*—Brian L. Johnson
*Attorney, Agent, or Firm*—Myers Bigel Sibley & Sajovec, PA

[57] ABSTRACT

A telephone base station allows a wire telephone network to be accessed by multiple cellular terminals within the local region of the base station. The users are generally members of a specified group such as a family or business. The base station is connected to the wire telephone network by a single line so that the radio transceiver of the base station communicates with the multiple cellular terminals serially. Each of the cellular terminals is authenticated upon entry of the local area. During communication with a given terminal, the remaining terminals in the local area are prevented from accessing the base station. Upon receipt of an incoming call, a message is transmitted to the caller to identify the desired cellular terminal. The base station then communicates with the identified cellular terminal and prevents access by the remaining terminals.

12 Claims, 6 Drawing Sheets

U.S. PATENT DOCUMENTS

| | | | |
|---|---|---|---|
| 5,463,674 | 10/1995 | Gillig | 379/57 |
| 5,483,666 | 1/1996 | Yamada | 379/59 |
| 5,528,666 | 6/1996 | Weigand | 379/58 |
| 5,550,895 | 8/1996 | Burson | 379/59 |
| 5,592,531 | 1/1997 | Cheng | 379/58 |
| 5,592,532 | 1/1997 | Koizumi | 379/58 |
| 5,594,782 | 1/1997 | Zizker | 379/59 |

OTHER PUBLICATIONS

*America's First Personal Communications Service (PCS) Is Claimed*, Audio Week, Apr. 5, 1993.

*Nation's First Commercial PCS Introduced by SW Bell*, E. Messmer, Network World, vol. 10, Issue 14, p. 4(2), Apr. 5, 1993.

*Mitsubishi Electric to Enter Radio Base Station Market for Digital Cellular Phones*, Mitsubishi Weekly, vol. 9, No. 9, Mar. 5, 1993.

*Wireless System Manufacturers Develop Microcell Equipment*, Phillips Business Information, Inc., PCS News, vol. 4, No. 6, Mar. 18, 1993.

*Cox Moves Ahead on Alternate Access, PCS*, G. Kim, Multichannel News, Nol. 12, No. 35, Sep. 2, 1992, p. 33(1).

*New Service Moves Toward National Information Infrastructure Via PCS*, Common Carrier Week, vol. 8, No. 7, Feb. 17, 1992, p. 5(2).

*In Search of a New Market*, R. Schneiderman, Microwaves & RF, vol. 30, No. 8, Aug. 1991, p. 33(5).

*Motorola Blurs Lines Between Cellular and Paging*, Dealerscope Merchandising, vol. 35, No. 7, Jul. 1993, p. 36.

*Mitsubishi Electric to Enter Radio Base Station Market for Digital Cellular Phones*, Comline Telecommunications, Mar. 5, 1993, p. 9.

*Expected to Show Reference Design at COMDEX: Motor Sampling PCS Chip Set*, Electronic Engineering Times, Oct. 26, 1992, p. 1.

*Bell Atlantic and Motorola to Test Personal Communications Service*, Audio Week, Feb. 17, 1992.

*New Service Moves Toward National Information Infrastructure Via PCS*, Common Carrier Week, Feb. 17, 1992.

MULTIPLE USER BASE STATIONS AND METHODS FOR RADIO PERSONAL COMMUNICATIONS SYSTEMS

CROSS REFERENCE TO RELATED APPLICATION

This application is a continuation-in-part of application Ser. No. 08/148,828 filed Nov. 4, 1993, now U.S. Pat. No. 5,428,668, and assigned to the assignee of the present invention, the disclosure of which is incorporated herein by reference.

FIELD OF THE INVENTION

This invention relates to communications systems and more particularly to radio personal communications systems for use within wide area cellular networks.

BACKGROUND OF THE INVENTION

Radio communications systems are increasingly being used for wireless mobile communications. An example of a radio communications system is a wide area cellular phone network. Cellular radio communications systems are wide area communications networks which utilize a frequency (channel) reuse pattern. The design and operation of an analog cellular phone system is described in an article entitled *Advanced Mobile Phone Service* by Blecher, IEEE Transactions on Vehicular Technology, Vol. VT29, No. 2, May, 1980, pp. 238–244. The analog mobile cellular system is also referred to as the "AMPS" system.

Recently, digital cellular phone systems have also been proposed and implemented using a Time-Division Multiple Access (TDMA) architecture. Standards have also been set by the Electronics Industries Association (EIA) and the Telecommunications Industries Association (TIA) for an American Digital Cellular (ADC) architecture which is a dual mode analog and digital system following EIA/TIA document IS-54B. Telephones which implement the IS-54B dual mode architecture are presently being marketed by the assignee of the present invention. Different standards have been promulgated for digital cellular phone systems in Europe. The European digital cellular system, also referred to as GSM, also uses a TDMA architecture.

Proposals have recently been made to expand the cellular phone network into a radio personal communications system. The radio personal communications system provides mobile radio voice, digital, video and/or multimedia communications using radio personal communications terminals. Thus, any form of information may be sent and received. Radio personal communications terminals include a radio telephone, such as a cellular telephone, and may include other components for voice, digital, video and/or multimedia communications.

A radio personal communications system includes at least one telephone base station also referred to herein as a base station. A base station is a low power transceiver which communicates with a radio personal communications terminal such as a cellular terminal over a limited local region, such as tens of meters, and is also electrically connected to the conventional public wire network. The base station allows the owner of a radio personal communications terminal to directly access the wire telephone network without passing through the cellular phone network, whose access rates are typically more costly. When located outside the range of the base station, the cellular terminal automatically communicates with the cellular phone network at the prevailing access rates.

SUMMARY OF THE INVENTION

The present invention is a telephone base station which allows the wire telephone network to be accessed by multiple cellular terminals within the local region of the base station. The present invention stems from the realization that it is desirable to allow multiple users to access the wire telephone network via a base station. These users are generally not public users. Rather, they belong to a specified group. For example, each member of a family may have a cellular terminal which can access the wire telephone network via the base station when the cellular terminal is within the local region of the base station. Similarly, each member of a business may have a cellular terminal which can access the wire telephone network via the base station when the cellular terminal is within the local region in the cell. Accordingly, the need to access the cellular network at the prevailing access rates is reduced.

A telephone base station according to the present invention connects a wire telephone network to a plurality of cellular terminals within a local region in a cell of a wide area cellular network which uses a plurality of channels within a cellular network spectrum. The telephone base station includes a portable housing so that it can be purchased by a consumer and easily installed at the home, office or other location. Wire telephone network connecting means extends within the portable housing. Preferably, the wire telephone network connecting means is a single line wire telephone network connecting means and is implemented via a standard single line telephone jack. The radio transceiver in the portable housing communicates with the plurality of cellular terminals within the local region using a single channel selected from the cellular network spectrum. Since a single connection to the wire telephone network is provided, the radio transceiver communicates with a plurality of cellular terminals serially, such that the radio transceiver only communicates with a single one of the cellular terminals at any time.

Since the telephone base station should only operate with a plurality of predefined users, the telephone base station includes authenticating means, which is responsive to entry of a cellular terminal into the local region, for identifying the cellular terminal as one of the plurality of cellular terminals. Moreover, since only a single cellular terminal can communicate with the wire telephone network via the telephone base station at any given time, the base station includes access preventing means for preventing communication between the base station and remaining cellular terminals in the local region during communication with a given cellular terminal. The access preventing means may also operate to prevent access to the base station by remaining terminals in the local region during authentication of a given terminal. Accordingly, only a single cellular terminal can place a call with the wire network via the base station at a given time. While the placed call is in progress, the remaining cellular terminals to the base station is also prevented. If calls are placed during this time, remaining terminals may be forced to place these calls via the cellular network at the prevailing access rates. Alternatively, a busy signal may be transmitted so that the caller places the call again at a later time.

When a telephone call is placed to one of the cellular terminals via the wire telephone network, the cellular terminal in the local region for which the call is intended is identified. In particular, an inbound call is accepted from the wire telephone network via the wire telephone network connecting means. A request is made via the wire telephone network, for identification of a cellular terminal to which the inbound call is directed. Identification of the cellular terminal is accepted via the wire telephone network. The base station transceiver then communicates with the identified cellular terminal.

In a preferred embodiment of the invention, a stored audible message is transmitted by the base station to the wire network via the wire telephone network connector, to request identification of the intended recipient of the inbound call. The message is preferably digitally stored in the base station and may state, for example, "To speak with John Doe, press 1; to speak with Jane Doe, press 2; and to speak with Jim Doe, press 3". The telephone base station preferably accepts DTMF tones from the wire telephone line in response to this message to identify the cellular terminal, and then routes the inbound call to the identified cellular terminal.

According to methods of the present invention, a portable telephone base station is operated with multiple users by locating the portable telephone base station in a cell of a wide area cellular network which uses a plurality of channels within a cellular network spectrum. The portable telephone base station is connected to the wire telephone network. The radio transceiver of the portable telephone base station is controlled to communicate with a predetermined plurality of cellular terminals within the local region using a channel selected from the cellular network spectrum, such that the predetermined plurality of cellular terminals within the local region access the wire telephone network via the portable base station. Preferably, the radio transceiver is controlled to serially communicate with the predetermined plurality of cellular terminals, such that only a single one of the cellular terminals within the local region accesses the wire telephone network via the portable base station at any time.

Upon entry of a cellular terminal into the local region, it is authenticated to identify the cellular terminal as one of the predetermined plurality of cellular terminals. After successful authentication, the cellular terminal is attached to the telephone base station, such that it can accept calls from and initiate calls to the telephone base station. Also, during communication with a cellular terminal in the local region, access to the base station by remaining cellular terminals within the local region is prevented. Upon receipt of an inbound call to the base station from the wire telephone network, the cellular terminal to which the inbound call is directed is identified. Identification takes place by requesting identification via the wire telephone network and accepting an identification from the wire telephone network. Identification is preferably requested by transmitting a stored audible message to the wire telephone network. Identification is accepted by decoding DTMF tones or voice messages which are received from the wire telephone network.

Accordingly, multiple members of a predefined group may use the portable base station to access the wire telephone network when in the local region of the base station, and thereby avoid paying the higher access rates of the wide area cellular network.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
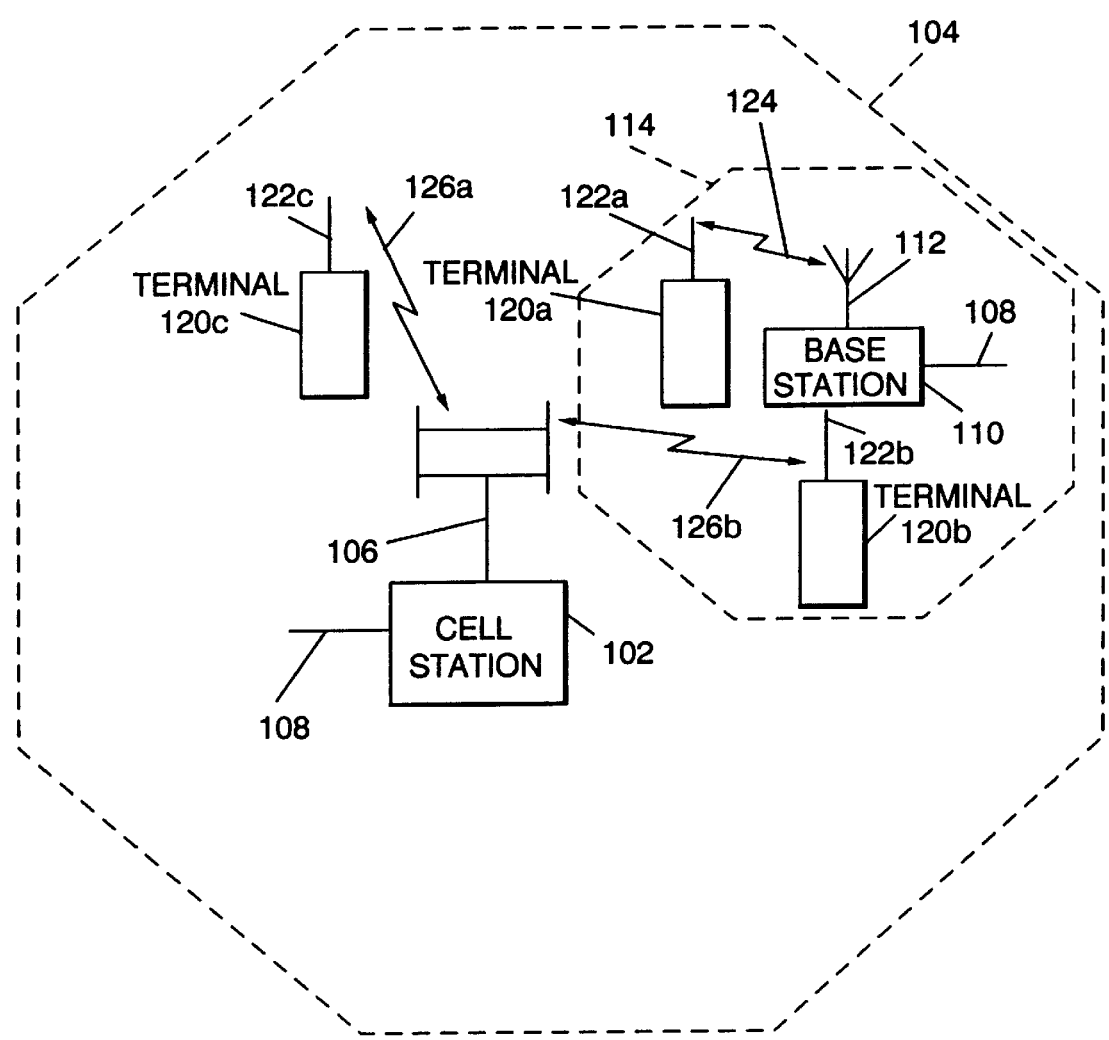
FIG. 1 schematically illustrates a radio personal communications system including a base station and a plurality of cellular terminals, with radio communications between the terminal, the base station and a wide area cellular network.

Referring now to FIG. 1, a conceptual diagram of a radio personal communications system according to the present invention is shown. Such a system operates within a cellular communications network which allocates portions of a plurality of frequencies (channels) within a cellular spectrum to separate geographic cells. Thus, the system provides a wide area wireless communications network having the capacity to provide high quality wireless communications to a large number of users with a limited number of frequencies allocated to the wide area cellular network. As shown in FIG. 1, a wide area cellular network includes at least one radio network cell station 102, such as a cellular telephone cell station, for transmitting and receiving messages in a network cell range indicated by 104, via cell antenna 106. The range 104 of radio network cell station 102 is typically represented graphically as illustrated in FIG. 1. Radio network cell station 102 also interfaces with the wire network 108. It will be understood by those having skill in the art that a wide area cellular network typically includes many radio network cell stations 102 to cover a large area. In such a system each radio network cell station 102 covers a cell (range) 104 within wide area cellular network and may interface with a central station (not shown) by wireless (radio) communications. The central station may provide the connection to wire network 108 for all of the network cell stations 102 that make up wide area cellular network.

Still referring to FIG. 1, a telephone base station 110 is located within the cell (range) 104 of a network cell station 102 of wide area cellular network. Base station 110 includes a low power transceiver for transmitting and receiving via base station antenna 112, over a limited local region 114, typically on the order of tens of meters. Thus, a base station may be used for transmission and receipt of radio personal communications in a home or office. Base station 110 also is electrically connected to the wire telephone network 108. Wire telephone network 108, is also referred to as the Public Switched Telephone Network (PSTN). PSTN 108 is the regular "wire line" telephone system supplied by, for example, the regional Bell Operating Companies, and may use copper wire, optical fiber or other stationary transmission channels. Base station 110 may be wired directly to PSTN 108 or connect through a PABX (not shown).

Still referring to FIG. 1, a plurality of cellular terminals 120a–120c are shown for radio communications with both base station 110 and radio network cell station 102 via antennas 122a–122c. Cellular terminals 120a–120c include a radio telephone such as a cellular phone. Cellular terminals 120a–120c may also include, for example, a full computer keyboard and display, a scanner, and full graphics and multimedia capabilities to provide a radio personal communications terminal.

Base station 110 is configured to communicate with a predetermined set of cellular terminals 120a–120c, for example belonging to members of a family or business. As illustrated in FIG. 1, when a cellular terminal 120a is within the local region 114 of the base station 110, a radio link 124 therebetween is established so that the cellular terminal 120a is attached to the base station 110. As also shown in FIG. 1, when a terminal 120c is outside the local region 114 of the base station 110, but within the cell 104, a new radio link 126a is automatically established with the network cell station 102 to attach the terminal 120c to the wide area cellular network. Thus, when a user is relatively close to the base station 110 (i.e. within the home or office), wireless communications take place with the base station so that wide area cellular network, with its higher billing rate structure, is bypassed. When the user is relatively far from the base station 110, communications take place with the cellular network.

The base station 110 preferably provides a single line connection to wire network 108. Thus, only one cellular terminal 120 can communicate with base station 110 at a time. Accordingly, if a call is first placed by cellular terminal 122a, via base station 110, or a call is relayed from wire telephone network 108 to cellular terminal 122a via base station 110, then cellular terminal 120b prevented from communicating with wire telephone network 108 via base station 110, even though terminal 126b is within the local region 114 of base station 110. As described below, base station 110 includes access preventing means for preventing access to the base station during communication with a cellular terminal in the local region, by remaining cellular terminals within the local region. The access preventing means may cause a busy signal to be received, so that the user of terminal 120b places or receives the call later. Alternatively, terminal 120b may communicate with cell station 102 at higher access rates, as illustrated in FIG. 1 by radio link 126b.

It will be understood by those having skill in the art that a complete radio personal communications system may include many base stations 110, terminals 120 and radio network cell stations 102. It will also be understood by those having skill in the art that conventional cellular communications and handoff protocols may be used between the base station 110 and cellular terminals 120a–120c, and need not be described further herein.

In the radio personal communications system described in FIG. 1, it is important to avoid co-channel interference between base station 110 and the radio network cell station 102. Accordingly, the operator of cellular network, which has typically been assigned the use of a specific plurality of cellular channels (frequencies) within a frequency spectrum of a designated geographic region by a regulatory authority, is allowed to assign cellular channels and optionally power levels, of base station 110. The wide area cellular network operator (provider) can assign a channel and optionally power level to base station 110 to minimize same channel interference and to maximize revenue from the assigned frequency spectrum, as described in application Ser. No. 08/148,828 cited above.

Figure 2:
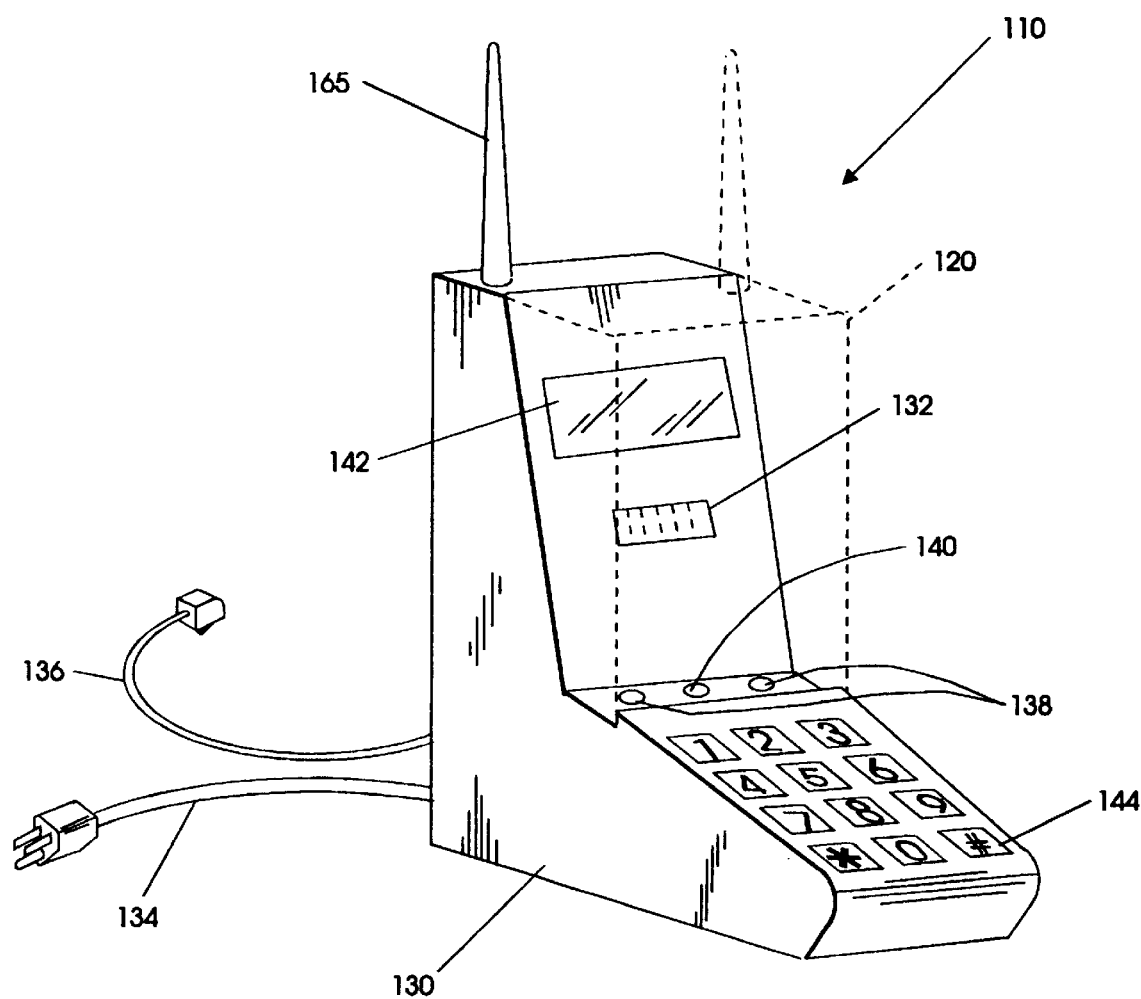
FIG. 2 illustrates a front perspective view of an embodiment of a base station of the present invention, with a terminal shown in hidden lines.

An embodiment of a base station and cellular terminal according to the present invention is illustrated in FIG. 2. Base station 110 includes housing 130 which is adapted to cooperatively mate with cellular terminal 120 and provide an electrical interface between base station 110 and cellular terminal 120 using electrical connector 132 or other electrical connecter means. Base station 110 is connected to a power source (power outlet) by power line connector 134 or other power connection means and to a wire telephone network by a wire telephone network connector 136 extending from base station 110 to within housing 130 or other means for electrically connecting base station 110 to a wire telephone network.

Preferably, a single wire telephone network line connector 136 is provided. As shown in FIG. 2, housing 130 is preferably portable to allow the user to move it and reinstall it in different locations. Base station 110 as illustrated in FIG. 2 may further include battery charger connector 138 or other charger interface means which connects battery powered cellular terminal 120 to a battery charger (not shown in FIG. 2) when cellular terminal 120 is inserted or parked in housing 130 as illustrated by hidden lines in FIG. 2. Sensor 140 detects when cellular terminal 120 is parked in housing 130 and the battery charger is activated to charge the battery of battery powered cellular terminal 120. It will be understood by those having skill in the art that a separate sensor 140 need not be used to detect when terminal 120 is parked in housing 130.

Base station 110 as illustrated in FIG. 2 also includes display 142 or other user indicating means. Alternatively, cellular terminal 120 may include an indicating means which may be used to display signals from base station 110 transmitted over electrical connector 132 when cellular terminal 120 is parked in housing 130. Base station 110 may also include keyboard 144 or other user input means. Alternatively, as with display 142, cellular terminal 120 may include an input means which may be used to provide inputs to base station 110 when cellular terminal 120 is parked in housing 130.

Figure 3:
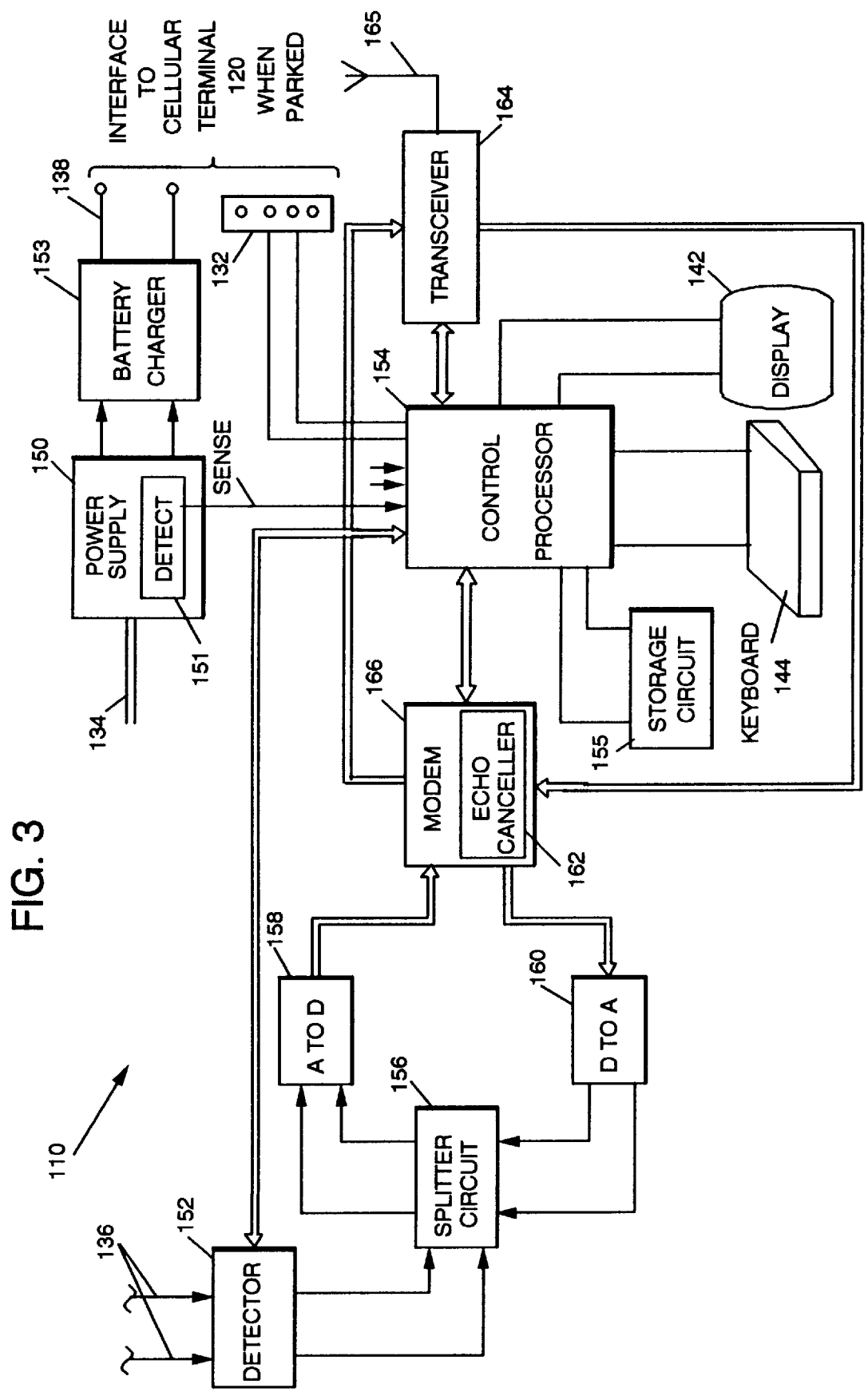
FIG. 3 is a schematic block diagram of a base station according to the present invention.

A block diagram of an embodiment of a base station 110 of the present invention is illustrated in FIG. 3. Power supply 150 is connected to power line connector 134 and provides the power supply voltages to the circuitry of base station 110. Power supply 150 further includes power detection means 151 for detecting when the connection of power line connector 134 to the power source has been lost and for providing a sense signal to control processor 154 indicating that power has been lost.

Ringing current and exchange battery voltage detector 152 is electrically connected to wire telephone connector 136 and includes means for detecting an incoming call on wire telephone connector 136 which is connected to wire telephone network 108. Detector 152 further detects if the electrical connection of wire telephone network 108 to connector 136 has been lost. Detector 152 supplies signals to control processor 154 when an incoming call "ring" is detected and when the connection to wire telephone network 108 is lost. An indication that the wire telephone network (line) connection has been lost may then be sent to display 142 under the control of control processor 154.

Control processor 154, in cooperation with ringing current and exchange battery voltage detector 152 provide activation means for initiating communications between wire telephone network 108 and cellular terminal 120 through base station 110 when cellular terminal 120 is within region 114. For incoming calls from wire telephone network (line) 108, detector 152 detects the incoming call and sends an activation signal to control processor 154 which in turn controls subsequent communications operations of base station 110. For calls initiated from cellular terminal 120, control processor 154 detects the communication from cellular terminal 120 received by transceiver circuit 164 or other radio transceiving means connected to antenna 112 at a selected frequency within the spectrum of wide area cellular network. Control processor 154 sends a control signal to detector circuit 152 to generate OFF-HOOK and other signals such as pulse dialling that may be necessary to interface with a loop-disconnect line interface such as is typically used by wire telephone network 108. Control processor 154 also controls base station 110 for multiple cellular terminal operation as described in connection with FIG. 6.

Splitter circuit 156 effects a split of the two-wire, bidirectional telephone audio signal into a four-wire system of separate send and receive signals. Received signals from the wire telephone network 108 are converted from analog to digital by analog to digital converter (A to D) 158 while transmit signals to wire telephone network 108 are converted from digital to analog by digital to analog converter (D to A) 160. This allows all of the subsequent audio signal processing to be carried out digitally using digital signal processors. Echo canceler 162 attenuates echoes of the signal sent through connector 136 to PSTN wire network 108 to inhibit corrupting of the signal received from the PSTN. Echo canceler circuit 162 further prevents echoes being transmitted to cellular terminal 120 by transceiver circuit 164 or other radio transceiving means connected to antenna 112.

On incoming calls over wire telephone network (line) connector 136, transceiver circuit 164 responds to the ring detect from detector 152 under the control of processor 154 to communicate with cellular terminal 120 using a selected frequency within the frequency spectrum of the wide area cellular network. Storage circuit 155 or other storage means is electrically connected to control processor 154 to provide a storage capacity for program and data information such as a frequency indicating signal representing the selected frequency. Storage circuit 155 may include conventional readable and writable memory such as RAM or EEPROM.

After echo cancellation, modem 166 processes received digitized audio signals to extract any digital control messages that might be received along with the audio signal from the wire telephone network (line). Such digital control messages may, for example be programming information for base station 110 transmitted by the operator of wide area cellular network. Extracted digital control messages are passed to control processor 154. Modem 166 may perform data/speech discrimination. A digital signal processor such as Texas Instruments type TMS320C56 may be used for echo canceler 162 and modem 166.

Received digitized speech is passed to transceiver 164 for transmission. The digitized speech may first be compressed by compression circuit, not shown, to a lower bit rate using a conventional speech decoding algorithm such as CELP or VSELP. In an analog transmission embodiment of base station 110 of the present invention a conversion circuit, not shown, reconverts the discriminated speech to an analog signal for modulating transceiver 164 which in this embodiment is an analog transceiver.

Radio signals from cellular terminal 120 to base station 110 received by antenna 112 are detected and converted to digital speech signals by transceiver 164. The digital speech signals are then passed to echo canceler circuit 162 and modem circuit 166 for transmission on wire telephone network (line) connector 136 to wire network 108. Alternatively, the received signals may be digitized to complex number form, using for example the LOGPOLAR technique described in U.S. Pat. No. 5,048,049. The complex number stream is then passed to modem 166 for numerical demodulation and conversion to analog speech for sending on the wire telephone line.

The present invention may also be used for data transmission from cellular terminal 120 when cellular terminal 120 either incorporates a personal computer system or by plugging cellular terminal 120 into a personal computer to connect the computer to modem circuit 166 without the use of a direct wire telephone line cable connection to the computer. When handling data transmissions, modem circuit 166 and transceiver 164 translate the data stream between the over-the-air protocols used and normal wire telephone line data transmission protocols. Transceiver 164 may also detect when the received signal has reverted to voice and, responsive to control processor 154, effect a reversion of modem circuit 166 and echo canceler circuit 162 to the processing of voice signals.

Transceiver 164 may be selected to generate and receive signals conforming to any standard, for example, AMPS, ETACS, NMT450, NMT900, GSM, DCS1800 or IS54. In addition, transceiver 164 may generate or receive signals conforming to air-interface standard for communications with satellite systems, such as INMARSAT-M, INMARSAT-P, IRIDIUM, ODYSSEY, GLOBALSTAR, ELLIPSAT or M-SAT. All such standards may be utilized with the present invention to provide communications from cellular terminal 120 through normal PSTN wire lines 108 and avoiding using the wide area system.

Figure 4:
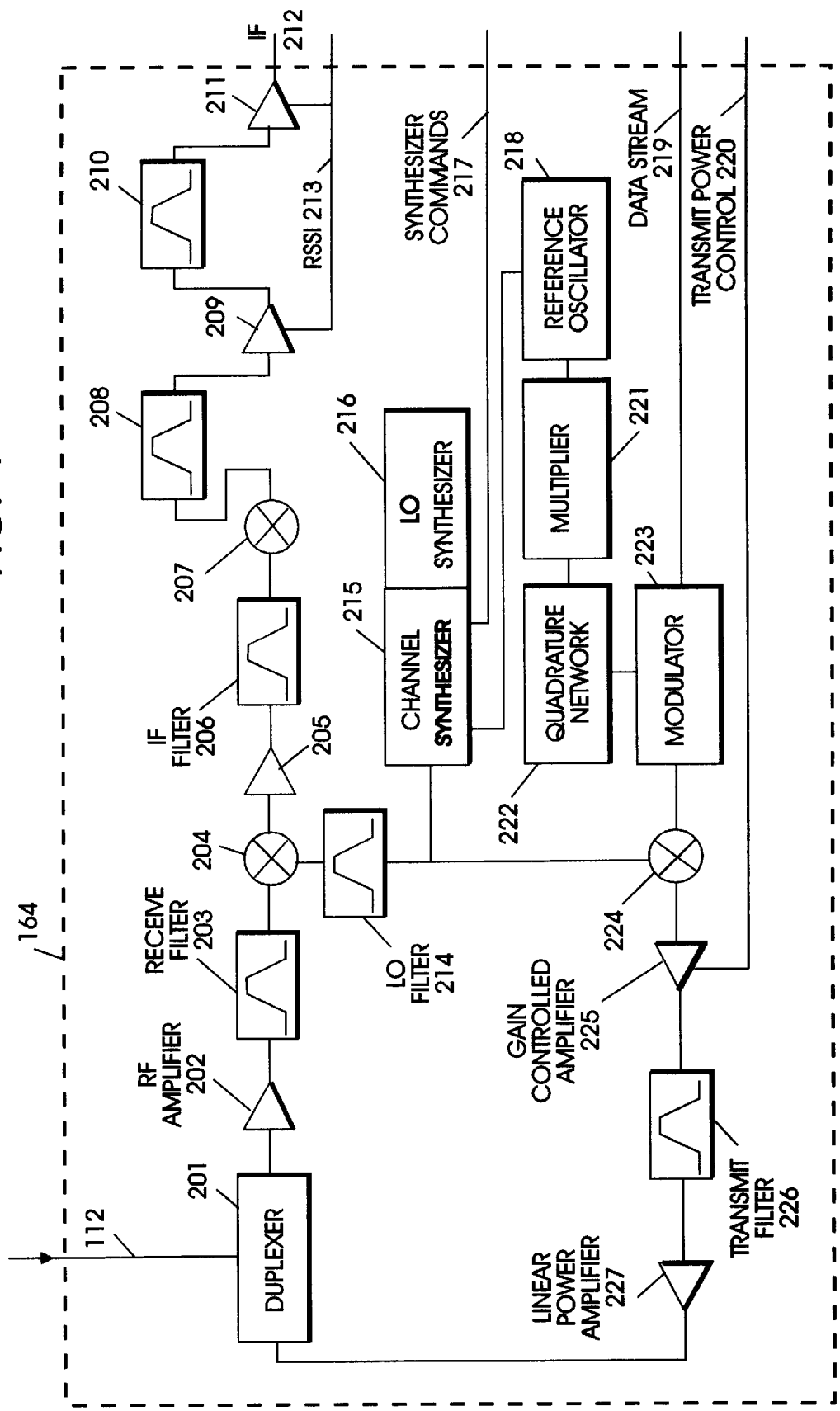
FIG. 4 is a schematic block diagram of a base station transceiver according to the present invention.

FIG. 4 illustrates a schematic block diagram of a radio transceiver 164 of FIG. 3. As shown, transceiver 164 includes circuitry for both the reception and transmission of the radio frequency signals. Signals received by the antenna 112 are directed to the receive circuits by the duplexer 201. The duplexer is a filter with two separate bandpass responses: one for passing signals in the receive band and another for passing signals in the transmit band. Duplexer 201 allows simultaneous transmission and reception of signals by using different receive and transmit frequencies. For example, in the ADC architecture, the receive and transmit frequencies are separated by 45 MHz.

After passing through the duplexer 201, received signals are amplified by a low noise radio frequency (RF) amplifier 202. This amplifier provides just enough gain to overcome the expected losses in the front end circuitry. After amplification, unwanted components of the signal are filtered out by the receive filter 203. After filtering, the signal is mixed down to a first intermediate frequency (IF) by mixing it in mixer 204 with a second signal generated by the channel synthesizer 215 and filtered by Local Oscillator (LO) filter 214. The first IF signal is then amplified by amplifier 205 and unwanted mixing products are removed by IF filter 206. After filtering, the first IF is mixed in mixer 207 to yet another lower frequency or second IF signal, using a signal provided by local oscillator synthesizer 216. The second IF signal is then filtered by two filters 208 and 210, and amplified by multistage amplifiers 209 and 211 to obtain an IF signal 212 and a radio signal strength indication (RSSI) signal 213. Thereafter, it undergoes a process of detection, for example, as described in U.S. Pat. No. 5,048,059 to Dent, the disclosure of which is incorporated herein by reference.

In order to transmit, a datastream 219 is generated by modem 166 (FIG. 3). In ADC architecture, the datastream is organized as bursts for time division multiplexing with other users. Reference oscillator 218 generates a precise frequency which is used as a stable reference for the RF circuits. The output of oscillator 218 is passed through a multiplier 221 where it experiences a sixfold increase in frequency. This frequency is then passed into a quadrature network 222 which produces two signals of equal amplitude which have a quadrature phase relationship, i.e. they are offset by 90°. These quadrature signals, along with the datastream 219, are combined in the modulator 223 to create a modulated signal, as described in an article entitled *I and Q Modulators for Cellular Communications Systems,* D. E. Norton et al., Microwave Journal; Vol. 34, No. 10, October 1991, pp. 63–79. The modulated signal is passed to a mixer 224 which translates the signal to radio frequency. The exact radio frequency is determined by the local oscillator signal provided by the channel synthesizer 215. The radio frequency signal is passed through a variable gain controlled amplifier 225. The gain of this amplifier, which is controlled by means of a voltage on transmit power control line 220, determines the eventual output power, since the linear power amplifier 227 has fixed gain. Filtering is performed by transmit filter 226.

Figure 5:
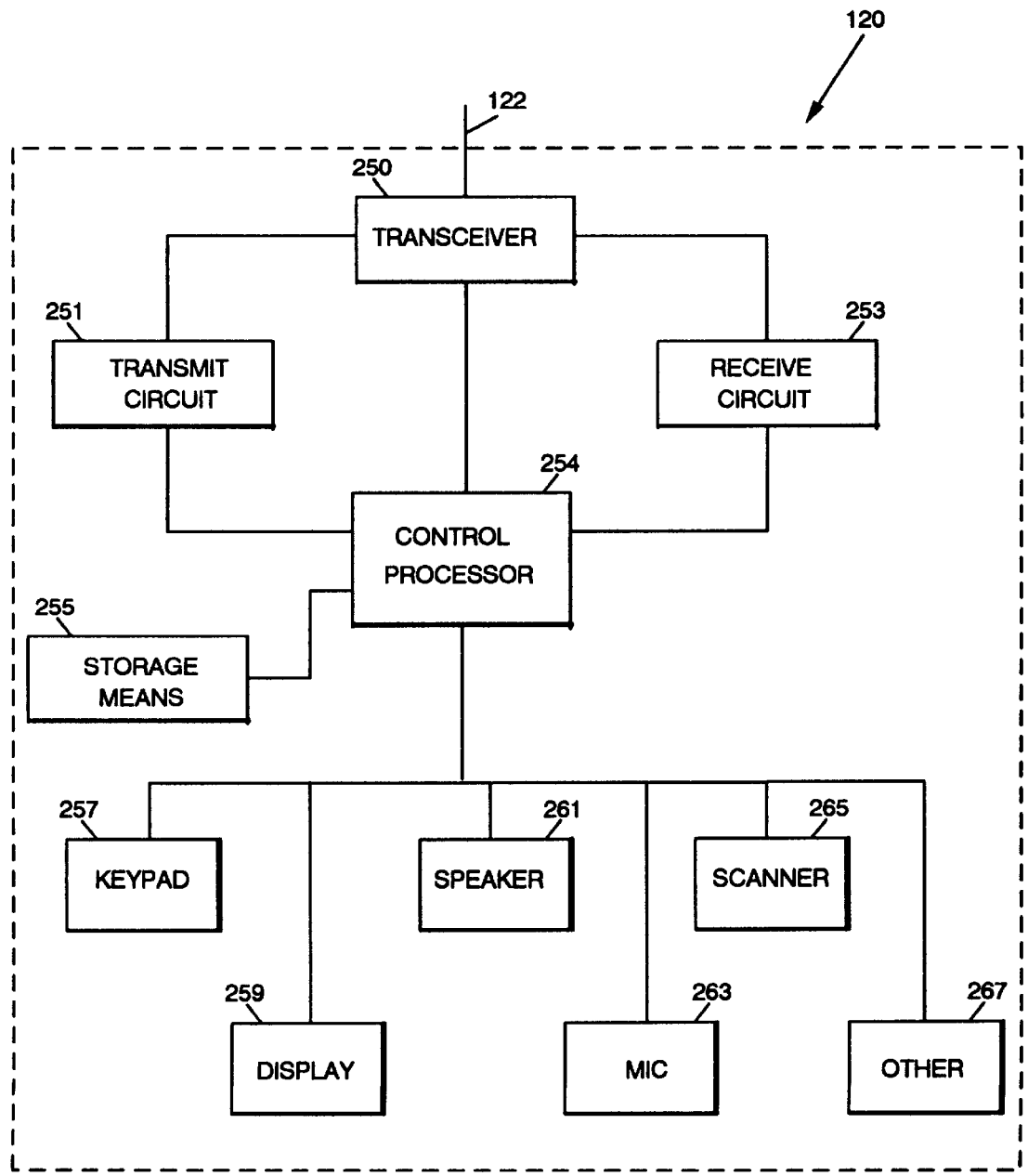
FIG. 5 is a schematic block diagram of a cellular terminal according to the present invention.

Referring now to FIG. 5, the design of terminal 120 is similar to that of base station 110 (FIG. 3) except that a ringing current and exchange battery voltage detector 152 are not present. As illustrated in FIG. 5, cellular terminal 120 includes transceiver 250 or other means for communicating with wide area cellular network when cellular terminal 120 is not within the base region (range) 114 of base station 110 and for communicating with transceiver 164 of base station 110 when cellular terminal 120 is within base region 114. Transceiver 250 is connected to antenna 122. Cellular terminal 120 further includes its own control processor 254 and storage means 255 similar to those described with respect to base station 110 and transmit circuit 251 and receive circuit 253 for receive and transmit signal processing respectively.

As further shown in FIG. 5, when terminal 120 is a cellular phone, it includes a keypad 257, a display 259, a speaker 261, and a microphone 263. In order to provide a computer communications terminal for receipt and transmission of audio, video and data and/or multimedia signals, keypad 257 may be a full scale personal computer keyboard and display 259 may be a large graphics display. A scanner 265 may also be provided as may other devices 267 such as disk drives and modems. The design of terminal 120 is well known to those having skill in the art and need not be described further herein.

Figure 6:
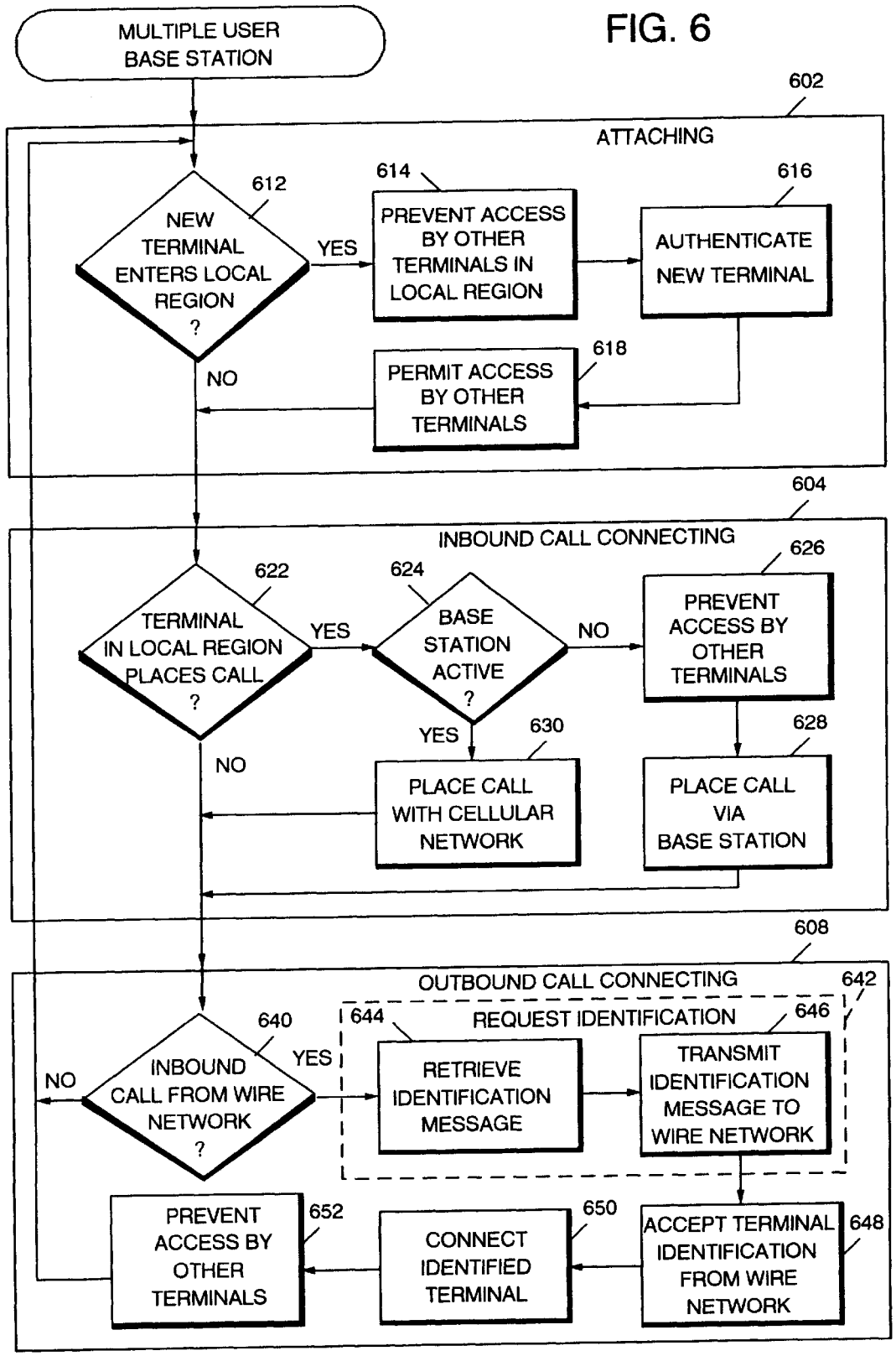
FIG. 6 is a flowchart illustrating operations of a multiple user base station according to the present invention.

Referring now to FIG. 6, operations for controlling multiple user base station 110 will now be described. It will be understood that the means and steps provided by these operations may be implemented by a stored program in storage circuit 155 which executes on control processor 154 (FIG. 3). However, alternatively, the means and steps provided by the operations of FIG. 6 may be implemented by special purpose hardware or combinations of a control processor and special purpose hardware. The operations of FIG. 6 generally include attaching 602, outbound call connecting 604 and inbound call connecting 608. Each of these operations will now be described.

Attaching 602 is used to place a new terminal 120 which enters local region 114 or which is powered on in local region 114 in standby mode. Attaching includes operations for registration, verification and exchange of ciphering information with the base station 110. As already described, the multiple user base station communicates with a predefined group of users, such as members of a family or office workers. Accordingly, it must be insured that the terminal 120 is a member of that group. According to the invention, each time a terminal requests to be attached to the base station, an authentication process is started. Authentication, verification and ciphering information is generally individual for each terminal. In addition, each terminal has its own identification code. Since the base station 110 preferably operates using cellular frequencies and protocols, authentication procedures which are conventionally used with a cellular terminal and radio network station 102 may be used by base station 108. Alternatively, special authentication procedures may be used such as those described in copending application Ser. No. 08/205,705, entitled *Secure Radio Personal Communication System and Method,* by Paul W. Dent and the present inventor Jaap Haartsen and assigned to the assignee of the present invention, the disclosure of which is hereby incorporated herein by reference.

Still referring to FIG. 6, details of attaching 602 will now be described. As shown at Block 612, a test is made as to whether an unregistered terminal 120 is present in the local region 114. If YES, a temporary connection between the unregistered terminal and the base station is made, while access by all other terminals in the local region to the base station is prevented, at Block 614. During attaching, base station 110 may transmit a busy signal to all other locked terminals so that they will not request a connection to the base station during the attaching process. This busy signal can either result in an audible busy tone in the attached terminals or can be used as an indication that calls can only be made and accepted through the wide area cellular network via cell station 102.

Authentication is performed at Block 616 using cellular telephone techniques or other authentication techniques. After authentication is completed and the new terminal is attached to base station 110 or rejected, the busy status is removed at Block 618 so that access to base station 110 by other terminals is permitted. New terminals can enter the local region and attach to base station 110, and previously attached terminals in the local region can set up a connection. It will also be understood by those having skill in the art that it may be possible to perform authentication in an interleaved manner with an ongoing telephone call or with other authentications. If this is the case, access preventing need not be performed at Block 614.

Still referring to FIG. 6, outbound call connecting 604 will now be described. In general, when an attached terminal such as terminal 120a within the local region 114 originates a call, the terminal's identification code is used to identify the terminal which is calling. A connection 124 is made to the base station 110 and the remaining terminals in the local region 114 such as terminal 120b are prevented from accessing the base station 110.

In particular, referring to Block 622, when an attached terminal in the local region 114 places a call, a test is made at Block 624 as to whether the base station 110 is already active. If the base station is already active, the call may be placed with the cellular network at Block 630 as illustrated in FIG. 1. Alternatively, if it is desired to avoid placing the call with the cellular network, a busy signal may be transmitted to the terminal which has placed the call so that it cannot place the call with the wide area cellular network and must try to place the call at a later time.

Referring again to Block 624, if the base station is not active, then at Block 626 access to base station 110 by all of the other attached terminals is prevented. Since the base station includes a single line to the wire telephone network, only a single call may be placed with the wire telephone network at any time. As described before, the terminals for which access is prevented may receive busy signals if calls are attempted to be placed, or may place calls with the wide area cellular network. At Block 628, the call is placed with the wire cellular network via the base station.

Still referring to FIG. 6, inbound call connecting 608 will now be described. In general, since the base station has only a single wire telephone network line and a single wire telephone network phone number, a caller who calls the base station is in effect placing a call to all of the cellular terminals 122 rather than a single desired cellular terminal. In one embodiment, a ringing tone command can be transmitted to all the terminals connected to the base station. However, and preferably, individual terminals can be accessed by distinguishing between their identification codes.

As shown at Block 640, upon receipt of an inbound call from the wire network 108 at base station 110, a request is returned by base station 110 to identify the cellular terminal to which the call is intended. As shown at Block 642, identification requesting includes retrieval of an identification message at Block 644 and transmission of the identification message to the wire network 108 at Block 646. For example, the base station may include a stored message which states: "For John Doe, press 1; for Jane Doe, press 2; and for Jim Doe, press 3" or the like. It will be understood that the identification message can also request identification of all terminals, for example: "Press 0 to call any family member". The identification message may be digitized and stored in storage circuit 155, retrieved from storage circuit 155 and transmitted by base station 108 to wire telephone network via wire telephone network connector 108.

In response, at Block 648, a terminal identification is accepted from the wire network. The terminal identification may be DTMF tones corresponding to the telephone key which is pressed. Alternatively, base station 112 may include voice recognition circuitry which recognizes a voice message such as a spoken name or number. Other identification techniques may be used. At Block 650, the identified terminal is connected. On reception of the terminal identification, base station 110 may include in its paging message the identification code which was received. Only the user whose identification matches that of the paging message will respond to the page. Call setup then proceeds as described above. At Block 652, access to the base station by the other terminals is prevented as was already described.

Accordingly, multiple members of a group may use a portable base station for wireless communications while avoiding the wide area cellular network when possible.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A telephone base station which connects a wire telephone network to a plurality of cellular terminals within a local region in a cell of a wide area cellular network which uses a plurality of channels within a cellular network spectrum, said telephone base station comprising:

a portable housing;

wire telephone network connecting means extending within said portable housing; and radio transceiving means in said portable housing, said radio transceiving means communicating with said plurality of cellular terminals within said local region using a channel selected from said cellular network spectrum;

terminal identifying means; responsive to receipt of an inbound call to said base station from said wire telephone network connecting means, for identifying a cellular terminal to which the inbound call is directed;

wherein said terminal identifying means comprises:

inbound call accepting means, for accepting an inbound call to said base station from said wire telephone network connecting means;

terminal identification requesting means, responsive to said inbound call accepting means, for requesting via said wire telephone network connecting means, identification of a cellular terminal to which the inbound call is directed;

terminal identification accepting means, responsive to said terminal identification requesting means, for accepting identification of a cellular terminal via said wire telephone network connecting means; and call placing means, for controlling said transceiving means to communicate with the identified cellular terminal.

2. A telephone base station according to claim 1 wherein said terminal identification requesting means comprises means for transmitting a stored audible message requesting identification via said wire telephone network connecting means.

3. A telephone base station according to claim 2 wherein said terminal identification accepting means comprises means for decoding DTMF tones received from said wire telephone line connecting means to identify a cellular terminal.

4. A telephone base station according to claim 2 wherein said terminal identification accepting means comprises means for decoding voice messages received from said wire telephone line connecting means to identify a cellular terminal.

5. A telephone base station which connects a wire telephone network to a plurality of cellular terminals within a local region in a cell of a wide area cellular network which uses a plurality of channels within a cellular network spectrum, said telephone base station comprising:

a portable housing;

wire telephone network connecting means extending within said portable housing;

radio transceiving means in said portable housing, said radio transceiving means communicating with said plurality of cellular terminals within said local region using a channel selected from said cellular network spectrum;

access preventing means, responsive to placement of a telephone call by one of said cellular terminals and responsive to receipt of a telephone call by one of said cellular terminals via said base station from said wire telephone network connecting means, for preventing remaining ones of said cellular terminals in said local region from accessing said wire telephone network connecting means, such that only a single cellular terminal communicates with said wire telephone network via said base station at any time;

wherein said access preventing means further comprises means for preventing access to said wide area cellular network by the remaining cellular terminals within said local region;

terminal identifying means, responsive to receipt of an inbound call to said base station from said wire telephone network connecting means, for identifying a cellular terminal to which the inbound call is directed;

wherein said terminal identifying means comprises:

inbound call accepting means, for accepting an inbound call to said base station from said wire telephone network connecting means;

terminal identification requesting means, responsive to said inbound call accepting means, for requesting via said wire telephone network connecting means, identification of a cellular terminal to which the inbound call is directed;

terminal identification accepting means, responsive to said terminal identification requesting means, for accepting identification of a cellular terminal via said wire telephone network connecting means; and call placing means, for controlling said transceiving means to communicate with the identified cellular terminal.

6. A telephone base station according to claim 5 wherein said terminal identification requesting means comprises means for transmitting a stored audible message requesting identification via said wire telephone network connecting means.

7. A telephone base station according to claim 6 wherein said terminal identification accepting means comprises means for decoding DTMF tones received over said wire telephone line connecting means to identify a cellular terminal.

8. A telephone base station according to claim 6 wherein said terminal identification accepting means comprises means for decoding voice messages received from said wire telephone line connecting means to identify a cellular terminal.

9. A method of operating a portable telephone base station which includes a cellular radio transceiver which transmits and receives within a local region, said method comprising the steps of:

locating said portable telephone base station in a cell of a wide area cellular network which uses a plurality of channels within a cellular network spectrum;

connecting said portable telephone base station to a wire telephone network;

controlling said radio transceiver to communicate with a predetermined plurality of cellular terminals within said local region, using a channel selected from said cellular network spectrum, such that said predetermined plurality of cellular terminals within said local region access said wire telephone network via said portable base station;

identifying a cellular terminal from said predetermined plurality of cellular terminals, to which an inbound call is directed responsive to receipt of said inbound call to said base station from said wire telephone network;

wherein said identifying step comprises the steps of:

requesting via said wire telephone network, identification of said cellular terminal to which said inbound call is directed;

accepting identification of said cellular terminal from said wire telephone network; and controlling said transceiver to communicate with the identified cellular terminal.

10. A method according to claim 9 wherein said requesting step comprises the step of:

transmitting a stored audible message to said wire telephone network which requests identification of said cellular terminal to which said inbound call is directed.

11. A method according to claim 10 wherein said accepting step comprises the step of:

decoding DTMF tones received from said wire telephone network to identify said cellular terminal to which said inbound call is directed.

12. A method according to claim 10 wherein said accepting step comprises the step of:

decoding voice messages received from said wire telephone network to identify said cellular terminal to which said inbound cell is directed.

* * * * *